N. L. BECK.
ANIMAL HOLDING IMPLEMENT.
APPLICATION FILED JAN. 29, 1915.

1,168,591.

Patented Jan. 18, 1916.

Inventor
Nels L. Beck

UNITED STATES PATENT OFFICE.

NELS L. BECK, OF EXIRA, IOWA.

ANIMAL-HOLDING IMPLEMENT.

1,168,591.  Specification of Letters Patent.  Patented Jan. 18, 1916.

Application filed January 29, 1915. Serial No. 5,050.

*To all whom it may concern:*

Be it known that I, NELS L. BECK, a citizen of the United States of America, residing at Exira, in the county of Audubon and State of Iowa, have invented certain new and useful Improvements in Animal-Holding Implements, of which the following is a specification.

The present invention relates to an implement for holding animals and it is especially intended to be used to hold hogs when ringing them. The implement is then placed over the snout of the hog and the slide rod drawn back until the loop has tightened around the snout. With a tight grip on the handle and over the drawn back rod, one man is then able to hold the animal with one hand while he applies the ring with the other.

One embodiment of my invention is illustrated in the accompanying drawing, where—

Figure 1:
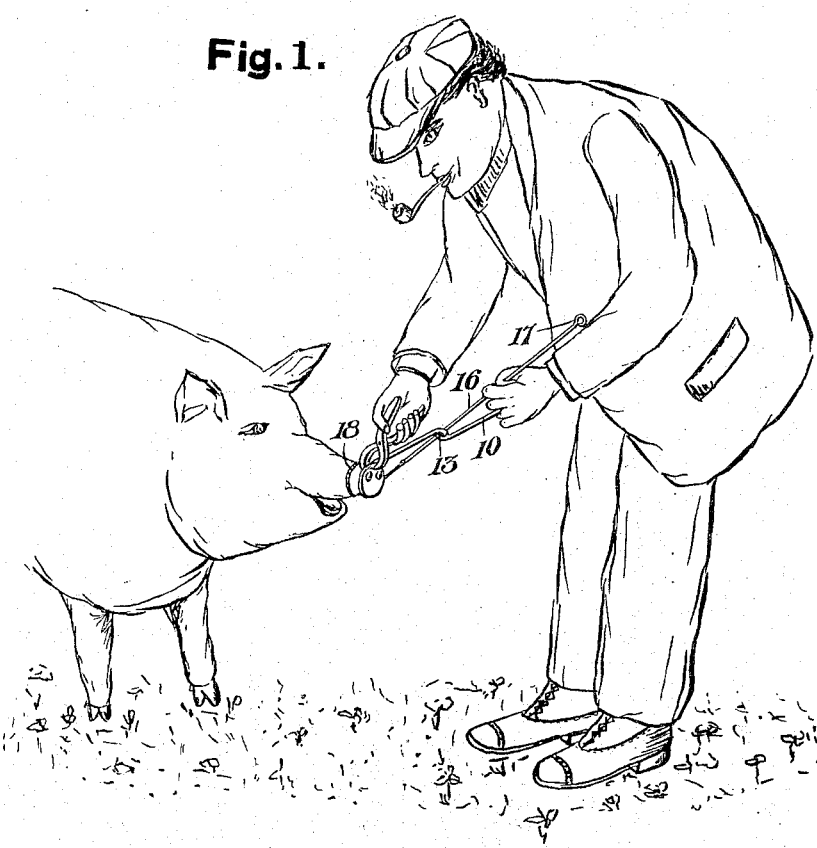
Figure 2:
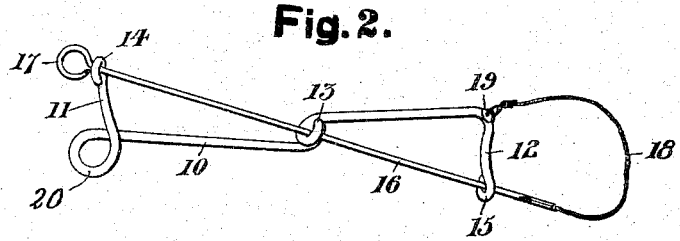

Figure 1 shows the manner in which the implement is used, and Fig. 2 an elevation of the implement itself.

The frame is preferably made of stout iron wire bent in the form of the letter Z with a middle or main portion 10 and two arms 11 and 12 bent approximately at 90° to the main portion and in opposite directions. The ends of the arms as well as the main portion of the frame are twisted around to form bearings 13, 14 and 15, which are arranged in alinement to serve as guides for the sliding member 16, which I prefer to make as a straight metallic rod with a handle 17 at one end of such a size and shape that it forms a stop against the bearing 14 preventing the rod from sliding. The arm 11 nearest the handle is turned over at the bend in order to form a large eyelet 20 constituting a grip or handle. The loop 18 is preferably made of wire rope and secured to the frame near or at the bend 19 of the arm 12. The other end of the loop is secured at the extremity of the rod 16.

As indicated in Figure 1, the implement is used most advantageously by gripping it with say the left hand, putting one or two fingers in the large eyelet 20. The rod 16 has in the meantime been pushed out until the handle 17 abuts against the bearing 14, thus enlarging the loop 18 as much as possible preparatory to being slipped over the snout of the animal. As soon as the loop is in position, it is tightened by pulling with the right hand on the handle 17. When it has been drawn back sufficiently, the rod 17 is thereupon held fast in the manner indicated in Fig. 1, by pressing on it with the thumb and first finger of the left hand. The operator has then his right hand free to hold a pair of pincers and put a ring in the nose of the animal.

I claim:—

1. An implement for holding animals comprising a frame, a rod and a loop forming member, said frame having a main portion and an arm at each end thereof, said arms projecting in opposite direction from said main portion and at right angles thereto, a bearing on said main portion and a bearing at the extremity of each arm, said bearings being in alinement so as to form guides for said rod, said loop forming member being secured to one end of said rod and to the adjacent arm respectively.

2. An implement for holding animals comprising a Z-shaped frame, a slidable member and a flexible loop forming member, said frame having a plurality of bearings for said slidable member arranged in alinement and situated on the free ends of the frame and on its middle portion, said loop forming member being attached to one end of said slidable member and to one of the angles of the Z-shaped frame.

3. An implement for holding animals comprising a Z-shaped frame, a slidable member and a flexible loop forming member, said frame having a plurality of bearings for said slidable member arranged in alinement and situated on the free ends of the frame and on its middle portion, said loop forming member being attached to one end of said slidable member and to one of the angles of the Z-shaped frame, a handle being provided at the other end of said slidable member, said handle constructed to form a stop against said frame in order to prevent said slidable member from sliding out of the frame.

4. An implement for holding animals comprising a frame, a slidable member and a loop member, said frame being constructed of metal wire bent approximately in the shape of the letter Z with a large eyelet at one of the bends to form a handle, the ends of the wire as well as the middle portion thereof being twisted around to form bearings for said slidable member, said loop member being made of flexible material and attached to said frame at its other bend and also to the adjacent end of said slidable member, a stop formed at the opposite end of said slidable member, said stop also serving as a handle.

In testimony whereof I affix my signature in presence of two witnesses.

NELS L. BECK.

Witnesses:
H. P. HANSEN,
P. J. MATSEN.

Copies of this patent may be obtained for five cents each, by addressing the "Commissioner of Patents, Washington, D. C."